(12) United States Patent
Chen et al.

(10) Patent No.: US 11,381,148 B2
(45) Date of Patent: Jul. 5, 2022

(54) CAMERA MODULE AND ELECTRONIC DEVICE INCLUDING THE SAME

(71) Applicant: TRIPLE WIN TECHNOLOGY(SHENZHEN) CO. LTD., Shenzhen (CN)

(72) Inventors: Shin-Wen Chen, New Taipei (TW); Long-Fei Zhang, Guangdong (CN); Kun Li, Guangdong (CN); Xiao-Mei Ma, Guangdong (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 383 days.

(21) Appl. No.: 16/568,937

(22) Filed: Sep. 12, 2019

(65) Prior Publication Data

US 2021/0006144 A1  Jan. 7, 2021

(30) Foreign Application Priority Data

Jul. 5, 2019 (CN) .......................... 201910605691.0

(51) Int. Cl.
*H02K 41/03* (2006.01)
*H02K 41/00* (2006.01)
(Continued)

(52) U.S. Cl.
CPC ......... *H02K 41/0356* (2013.01); *H02K 11/40* (2016.01); *H02K 41/00* (2013.01);
(Continued)

(58) Field of Classification Search
CPC ............... H02K 11/40; H02K 11/0141; H02K 41/0354; H02K 41/0356; H02K 2211/03;
(Continued)

(56) References Cited

U.S. PATENT DOCUMENTS

| 9,413,932 B2 | 8/2016 | Li et al. | |
| 2008/0164550 A1* | 7/2008 | Chen | H04N 5/2257 257/432 |

(Continued)

FOREIGN PATENT DOCUMENTS

TW  I643496 B  12/2018

*Primary Examiner* — Quyen P Leung
*Assistant Examiner* — Alexander A Singh
(74) *Attorney, Agent, or Firm* — ScienBiziP, P.C.

(57) ABSTRACT

A camera module shielded against electromagnetic interference but of reduced size comprises a voice coil motor, a circuit board, and a base between voice coil motor and circuit board. The voice coil motor comprises conductive housing. The circuit board comprises a conductive wire itself comprising shielded wire, ground pad, and a surrounding and grounded closed ground loop. The base comprises a main body and a conductive loop sleeved thereon. A first side of the conductive loop is electrically connected to the conductive housing, a second side of the conductive loop is electrically connected to the closed ground loop. The conductive housing, the conductive loop, and the closed ground loop form a shield against electromagnetic interference. The disclosure further provides an electronic device including the camera module.

18 Claims, 6 Drawing Sheets

(51) Int. Cl.
*H02K 41/035* (2006.01)
*H02K 11/40* (2016.01)
*H02K 41/02* (2006.01)

(52) U.S. Cl.
CPC ......... *H02K 41/02* (2013.01); *H02K 41/0354* (2013.01); *H02K 2211/03* (2013.01)

(58) Field of Classification Search
CPC ...... H02K 41/00; H02K 41/02; H02K 41/025; H02K 41/03; H02K 41/031; H02K 41/033; H02K 41/035; H02K 41/0352; H02K 11/30; H02K 11/35; H04N 5/2254; H04N 5/2252; H04N 5/2253
USPC ................. 310/12.16, 12.21, 12.01, 68 R
See application file for complete search history.

(56) References Cited

U.S. PATENT DOCUMENTS

2010/0158508 A1* 6/2010 Kim .................... H04N 5/2257
396/529
2015/0281528 A1* 10/2015 Li ........................ H04N 5/2252
348/357

* cited by examiner

CAMERA MODULE AND ELECTRONIC DEVICE INCLUDING THE SAME

FIELD

The subject matter herein generally relates to optical devices, and more particularly to a camera module and an electronic device including the same.

BACKGROUND

A metal shield can be installed on a camera module to shield the camera module from electromagnetic interference. The metal shield is soldered on a circuit board. To avoid short circuit, pins of the metal shield should avoid solders of the circuit board, so that the metal shield does not completely cover and shield the camera module. The metal shield is installed on the camera module. The manufacturing process of the camera module is complicated; hence the cost may be high. Furthermore, a size of the camera module may be large.

BRIEF DESCRIPTION OF THE DRAWINGS

Implementations of the present technology will now be described, by way of embodiment, with reference to the attached figures.

DETAILED DESCRIPTION

Figure 1:
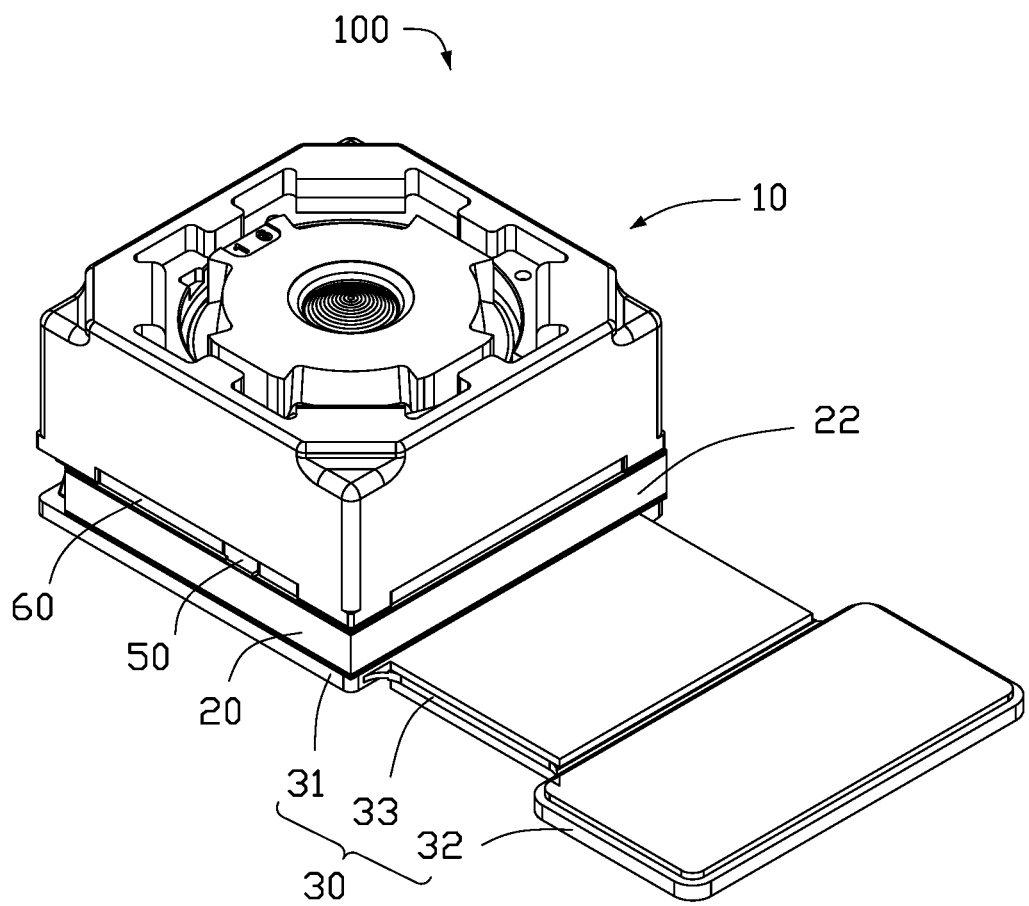
FIG. 1 is an isometric view of an embodiment of a camera module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

Figure 2:
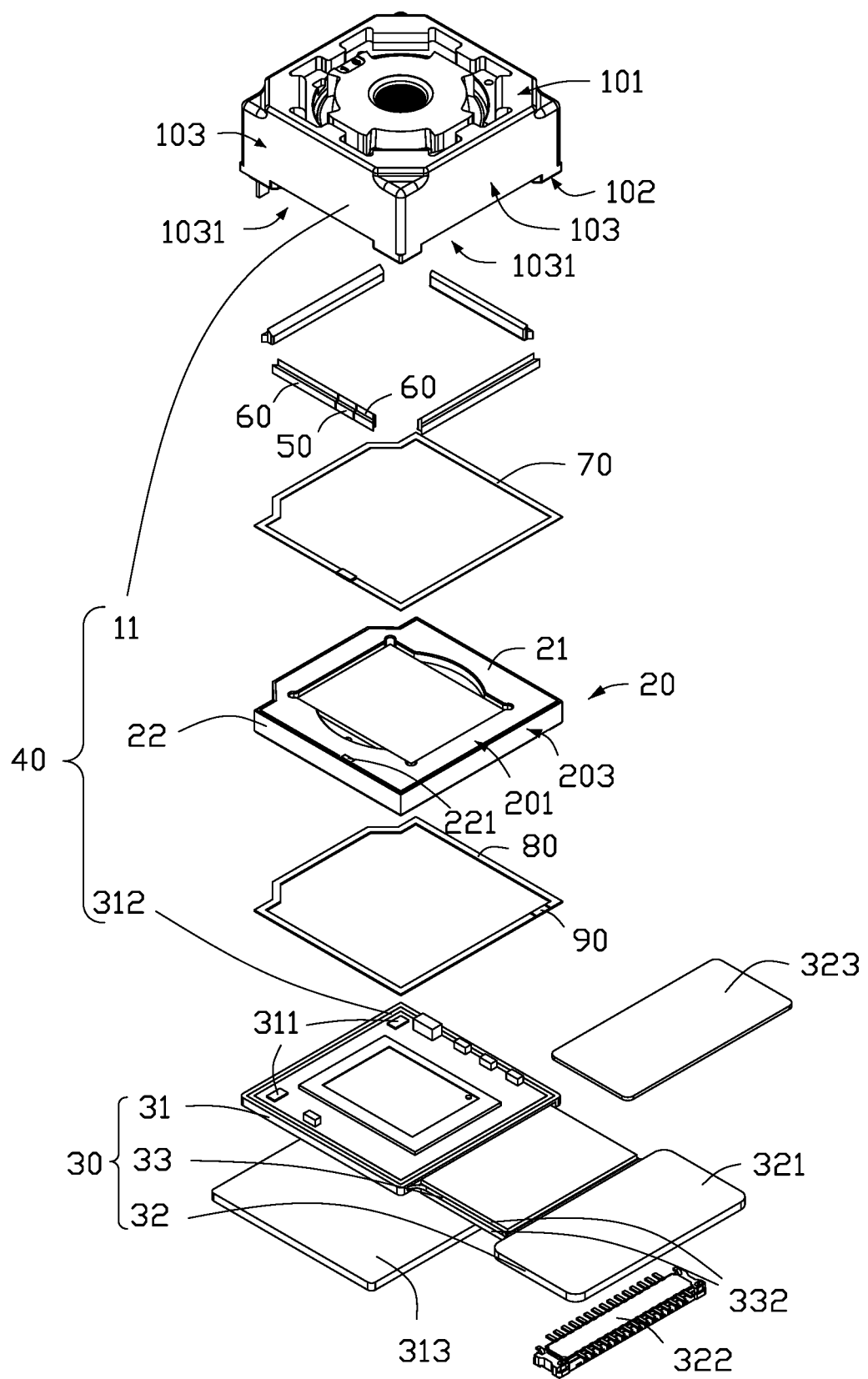
FIG. 2 is an exploded, isometric view of the camera module of FIG. 1.
Figure 3:
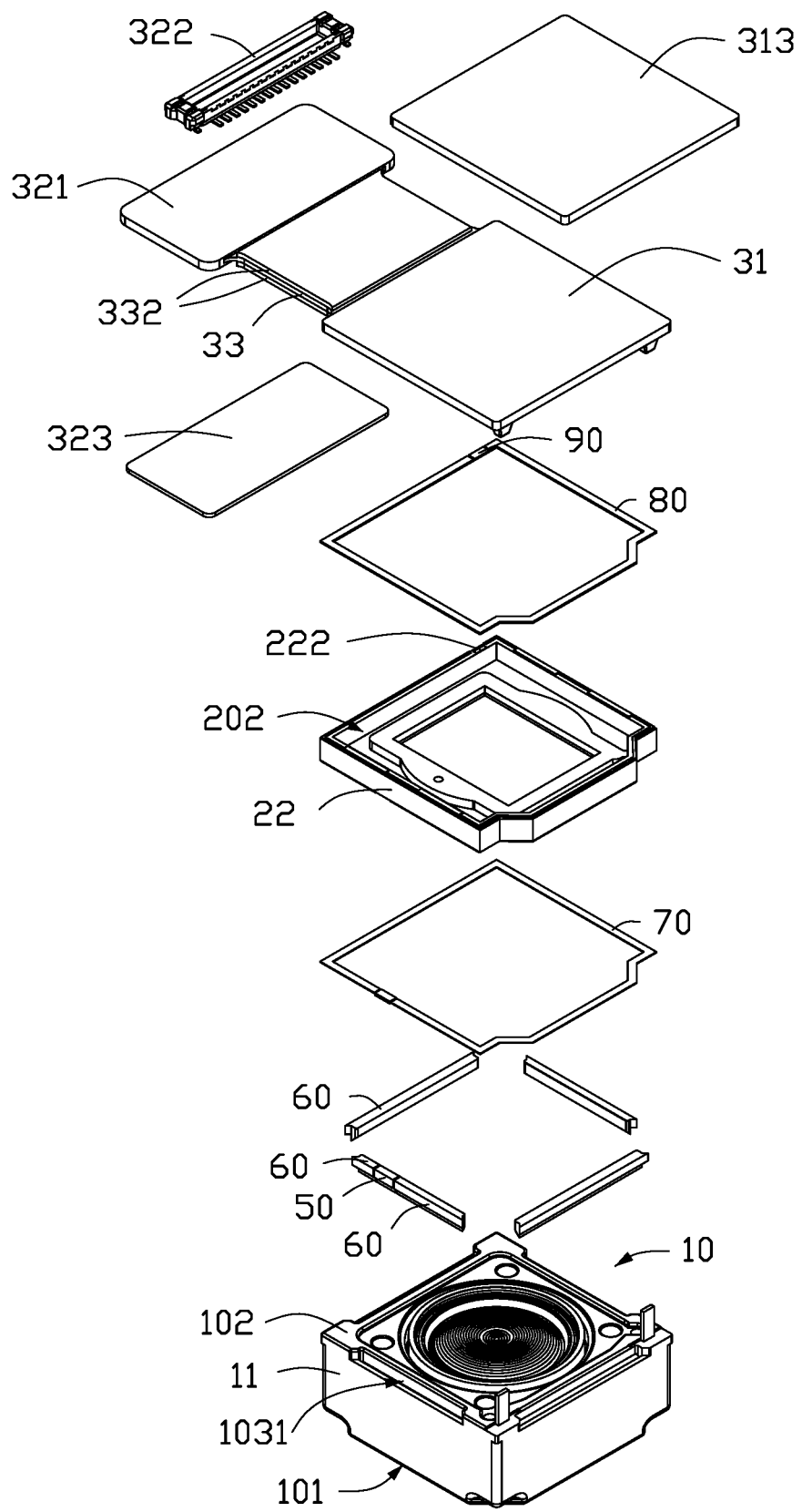
FIG. 3 is similar to FIG. 2, but viewed from another angle.

FIGS. 1-3 illustrate a camera module 100 comprising a voice coil motor 10, a base 20, and a circuit board 30. The base 20 is positioned between the voice coil motor 10 and the circuit board 30. The voice coil motor 10 comprises a conductive housing 11.

Figure 5:
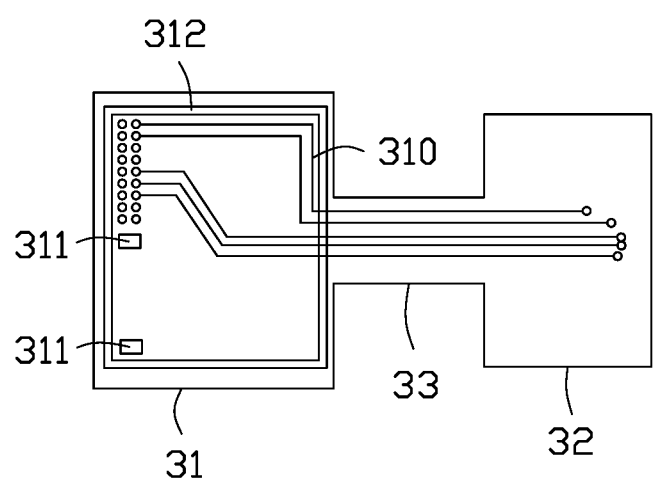
FIG. 5 is a schematic view of a part of a circuit board of the camera module of FIG. 1.

FIG. 5 illustrates that the circuit board 30 comprises a shielded wire 310, a ground pad 311, and a closed ground loop 312 surrounding the shielded wire 310 and the ground pad 311. The closed ground loop 312 is electrically connected to the ground pad 311.

FIGS. 2 and 3 illustrate that the base 20 comprises a main body 21, and a conductive loop 22 sleeved on an outside of the main body 21. The connective loop 22 comprises a first side and a second side opposite to the first side. The first side of the conductive loop 22 is electrically connected to the conductive housing 11, the second side of the conductive loop 22 is electrically connected to the closed ground loop 312. The camera module 100 comprises a shield structure 40 configured to shield the camera module 100 from electromagnetic interference. The shield structure 40 comprises the conductive housing 11, the conductive loop 22, and the closed ground loop 312.

The shield structure 40 can protect the camera module from interference from external electromagnetic signals. The configuration of the conductive loop 22 sleeved on an outside of the main body 21 and electrically connected to the conductive housing 11 and the circuit board 30 is such as to reduce a size of the camera module 100.

The conductive housing 11 comprises a first surface 101, a second surface 102 parallel to the first surface 101, and a plurality of third surfaces 103 connecting the first surface 101 and the second surface 102. An area of each connection between the second surface 102 and the corresponding third surface 103 is concave and defines a groove 1031. The first side of the conductive loop 22 is opposite to the groove 1031. The groove 1031 carries a first conducting resin layer 50. The conducting resin layer 50 is configured to electrically connect the conductive housing 11 and the conductive loop 22, so as to avoid contamination and damage to the camera module 100 caused by soldering the conductive housing 11 to the conductive loop 22.

One groove 1031 further carries an adhesive layer 60. The adhesive layer 60 is arranged on opposite sides of the first conducting resin layer 50. The adhesive layer 60 is configured for bonding the voice coil motor 10 and the base 20 together. In an alternative embodiment, each of the grooves 1031 carries an adhesive layer 60.

Figure 4:
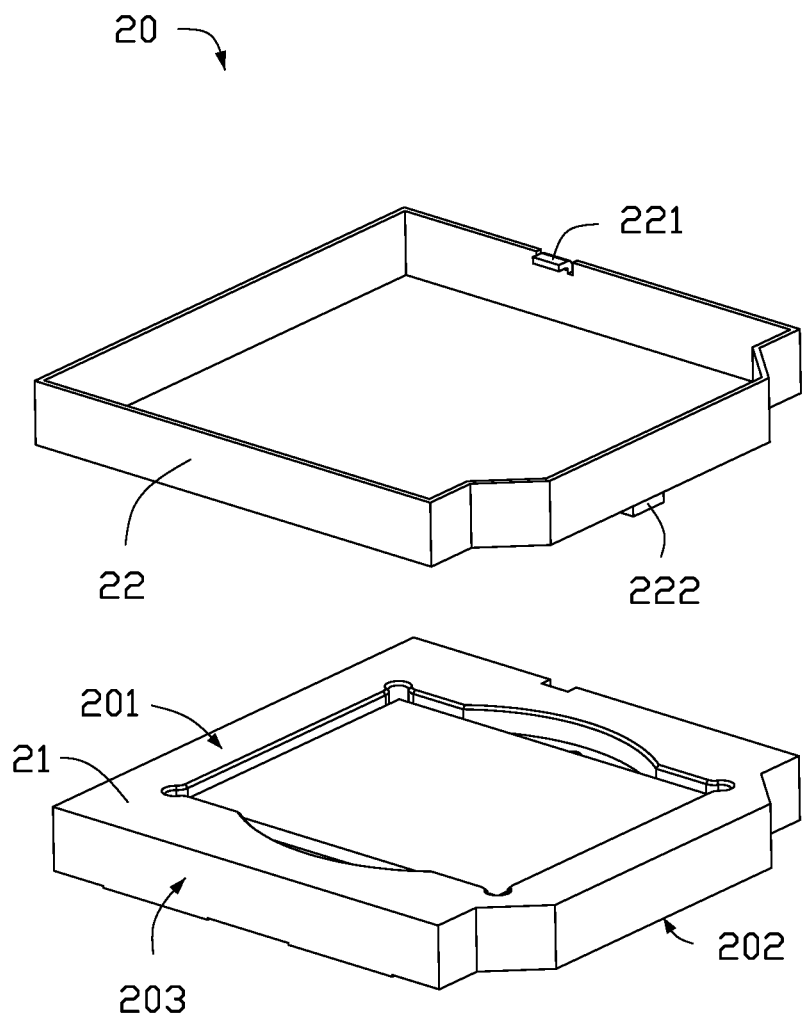
FIG. 4 is an exploded, isometric view of a base of the camera module of FIG. 1.

FIGS. 2 and 4 illustrate that the base 20 comprises a fourth surface 201 facing towards the second surface 102, a fifth surface 202 parallel to the fourth surface 201, and a plurality of sixth surfaces 203 connecting the fourth surface 201 and the fifth surface 202. The base 20 is a nonconductor. The conductive loop 22 is arranged on the sixth surface 203. An area of the first side of the conductive loop 22 adjacent to the fourth surface 201 extends inward to form a first spacer 221. The first spacer 221 is received in the groove 1031 and is electrically connected to the conductive housing 11 via the first conducting resin layer 50. The configuration of the first spacer 221 is such as to increase a touching area between the first conducting resin layer 50 and the conductive loop 22.

There is a first adhesive film 70 arranged between the second surface 102 and the fourth surface 201. The adhesive film 70 avoids areas of first conducting resin layer 50 and the conductive loop 22, and is configured for bonding the conductive housing 11 and the base 20 together.

The conductive loop 22 is formed on an outside of the sixth surface 203 by an in-mold injection process. There is an insulation layer coated on a side of the conductive loop 22 away from the sixth surface 203. The insulation layer is configured to isolate the conductive loop 22 and an external circuit to prevent short circuit.

FIGS. 2, 3 and 5 illustrate that the circuit board 30 comprises a first portion 31, a second portion 32 opposite to the first portion 31, and a third portion 33 connecting the first portion 31 and the second portion 32. The closed ground loop 312, the shielded wire 310, and the closed ground loop 312 are on the first portion 31.

FIG. 5 illustrates that both of the second portion 32 and the third portion 33 carry the shielded wire 310 and the ground pad 311. Portions of the ground pad 311 on the first portion 31, the second portion 32, and the third portion 33 are electrically connected to each other to provide a common end with low potential for the circuit board 30.

FIGS. 3 and 4 illustrate that an area of the second side of the conductive loop 22 adjacent to the fifth surface 202 extends inward to form a second spacer 222. The second spacer 222 is electrically connected to the closed ground loop 312 via the second conducting resin layer 90.

There is a second adhesive film 80 which is arranged on an area between ground loop 312 and the conductive loop 22 except for the area of the first conducting resin layer 50. The second adhesive film 80 is configured for bonding the base 20 and the first portion 31 of the circuit board 30.

A side of the first portion 31 away from the base 20 carries a first steel plate 313. The first steel plate 313 completely covers the shielded wire 310 on the first portion 31, and is electrically connected to the ground pad 311 on the first portion 31. The first steel plate 313 is part of the shield structure 40, and is configured to reinforce the mechanical strength of the first portion 31 of the circuit board 30 to improve the stiffness of the first portion 31.

The second portion 32 carries a second steel plate 323. The second steel plate 323 covers the shielded wire 310 on the second portion 32, and is electrically connected to the ground pad 311 on the second portion 32. The second steel plate 323 is part of the shield structure 40, and is configured to reinforce the mechanical strength of the second portion 32 of the circuit board 30 to improve the stiffness of the second portion 32. The second portion 32 further carries a connector 322, the connector 322 is used as an interface to connect the camera module 100 and an external circuit.

FIG. 3 illustrates that the third portion 33 carries two conductive layers 332. The conductive layers 332 respectively cover two sides of the shielded wire 310, and are electrically connected to the ground pad 311 on the third portion 33. The conductive layers 332 are parts of the shield structure 40. The conductive layer 332 comprises a silver foil, an aluminum foil, a copper foil, or any combination thereof.

Figure 6:
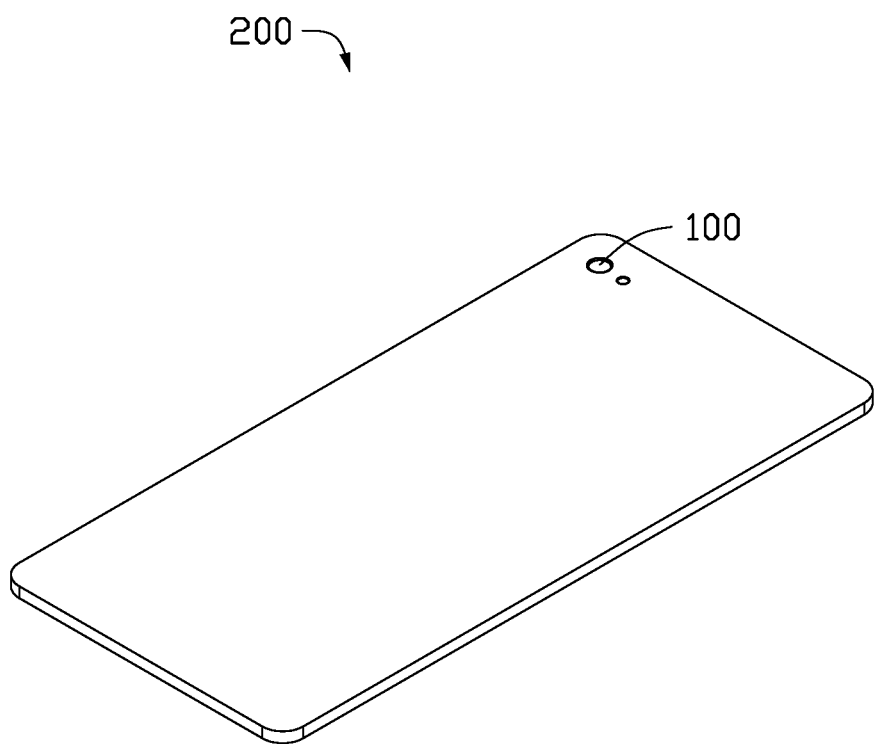
FIG. 6 is an isometric view of an embodiment of an electronic device having the camera module of FIG. 1.

FIG. 6 illustrates that the camera module 100 can be applied to various electronic devices having imaging capturing functions, such as mobile phones, computers, or cameras, etc.

The conductive loop, the closed ground loop, the first steel plate, the second steel plate and the conductive layer are electrically connected to the ground pad to form the shield structure. The structure of the shield is almost completely closed, effectively protecting the camera module from interference from external electromagnetic signals. The conductive loop is positioned so as to surround an outside of the base to reduce size of the camera module 100, and cost is reduced.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A camera module comprising:
   a voice coil motor comprising a conductive housing;
   a circuit board comprising a conductive wire, the conductive wire comprising a shielded wire, a ground pad, and a closed ground loop surrounding the shielded wire and the ground pad, the closed ground loop being electrically connected to the ground pad; and
   a base arranged between the voice coil motor and the circuit board, the base comprising a main body and a conductive loop sleeved on an outside of the main body, a first side of the conductive loop being electrically connected to the conductive housing, a second side of the conductive loop being electrically connected to the closed ground loop;
   wherein the conductive housing, the conductive loop, and the closed ground loop form a shield structure configured for shielding against electromagnetic interference signals.

2. The camera module of claim 1, wherein the conductive housing comprises a first surface, a second surface parallel to the first surface, and a plurality of third surfaces, an area of a connection between the second surface and one of the third surfaces is concave and defines a groove, the groove carries a first conducting resin layer, the first conducting resin layer is configured to electrically connect the conductive housing and the conductive loop.

3. The camera module of claim 2, wherein the base comprises a fourth surface facing towards the second surface, a fifth surface parallel to the fourth surface, and a plurality of sixth surfaces connecting the fourth surface and the fifth surface, the conductive loop is arranged on the sixth surfaces, an area of the first side of the conductive loop adjacent to the fourth surface extends inward to form a first spacer, the first spacer is received in the groove and is electrically connected to the conductive housing via the first conducting resin layer.

4. The camera module of claim 3, wherein an area of the second side of the conductive loop adjacent to the fifth surface extends inward to form a second spacer, the second spacer is electrically connected to the closed ground loop via a second conducting resin layer.

5. The camera module of claim 1, wherein the circuit board comprises a first portion, a second portion opposite to the first portion, and a third portion connecting the first portion and the second portion, the conductive wire is on the first portion, wherein each of the second portion and the third portion carries the shielded wire.

6. The camera module of claim 5, wherein a side of the first portion away from the base carries a first steel plate covering the shielded wire on the first portion and is electrically connected to the ground pad on the first portion, the first steel plate is a part of the shield structure.

7. The camera module of claim 5, wherein the second portion carries a second steel plate covering the shielded wire on the second portion and is electrically connected to the ground pad on the second portion, the second steel plate is a part of the shield structure.

8. The camera module of claim 5, wherein the third portion carries a conductive layer covering the shielded wire on the third portion and is electrically connected to the ground pad on the third portion, the conductive layer is a part of the shield structure.

9. The camera module of claim 8, wherein the conductive layer comprises a silver foil, an aluminum foil, a copper foil, or any combination thereof.

10. An electronic device comprising:
a camera module comprising:
a voice coil motor comprising a conductive housing;
a circuit board comprising a conductive wire, the conductive wire comprising a shielded wire, a ground pad, and a closed ground loop surrounding the shielded wire and the ground pad, the closed ground loop being electrically connected to the ground pad; and
a base arranged between the voice coil motor and the circuit board, the base comprising a main body and a conductive loop sleeved on an outside of the main body, a first side of the conductive loop being electrically connected to the conductive housing, a second side of the conductive loop being electrically connected to the closed ground loop;
wherein the conductive housing, the conductive loop, and the closed ground loop form a shield structure configured for shielding against electromagnetic interference signals.

11. The electronic device of claim 10, wherein the conductive housing comprises a first surface, a second surface parallel to the first surface, and a plurality of third surfaces, an area of a connection between the second surface and one of the third surfaces is concave and defines a groove, the groove carries a first conducting resin layer, the first conducting resin layer is configured to electrically connect the conductive housing and the conductive loop.

12. The electronic device of claim 11, wherein the base comprises a fourth surface facing towards the second surface, a fifth surface parallel to the fourth surface, and a plurality of sixth surfaces connecting the fourth surface and the fifth surface, the conductive loop is arranged on the sixth surfaces, an area of the first side of the conductive loop adjacent to the fourth surface extends inward to form a first spacer, the first spacer is received in the groove and is electrically connected to the conductive housing via the first conducting resin layer.

13. The electronic device of claim 12, wherein an area of the second side of the conductive loop adjacent to the fifth surface extends inward to form a second spacer, the second spacer is electrically connected to the closed ground loop via a second conducting resin layer.

14. The electronic device of claim 10, wherein the circuit board comprises a first portion, a second portion opposite to the first portion, and a third portion connecting the first portion and the second portion, the conductive wire is on the first portion, wherein each of the second portion and the third portion carries the shielded wire.

15. The electronic device of claim 14, wherein a side of the first portion away from the base carries a first steel plate covering the shielded wire on the first portion and electrically connected to the ground pad on the first portion, the first steel plate is a part of the shield structure.

16. The electronic device of claim 14, wherein the second portion carries a second steel plate covering the shielded wire on the second portion and is electrically connected to the ground pad on the second portion, the second steel plate is a part of the shield structure.

17. The electronic device of claim 14, wherein the third portion carries a conductive layer covering the shielded wire on the third portion and is electrically connected to the ground pad on the third portion, the conductive layer is a part of the shield structure.

18. The camera module of claim 17, wherein the conductive layer comprises a silver foil, an aluminum foil, a copper foil, or any combination thereof.

* * * * *